(12) United States Patent
Kosugi et al.

(10) Patent No.: US 8,997,719 B2
(45) Date of Patent: Apr. 7, 2015

(54) FUEL VAPOR PROCESSING APPARATUS

(75) Inventors: Ryuji Kosugi, Obu (JP); Takanori Akiyama, Obu (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 998 days.

(21) Appl. No.: 12/580,387

(22) Filed: Oct. 16, 2009

(65) Prior Publication Data

US 2010/0095938 A1  Apr. 22, 2010

(30) Foreign Application Priority Data

Oct. 21, 2008  (JP) ................................. 2008-270914

(51) Int. Cl.
*F02M 33/04* (2006.01)
*B01D 53/02* (2006.01)
*F02M 33/02* (2006.01)
*B60K 15/035* (2006.01)

(52) U.S. Cl.
CPC .......... *F02M 33/02* (2013.01); *B60K 15/03504* (2013.01); *B60K 2015/03514* (2013.01); *F02M 33/025* (2013.01); *Y02T 10/126* (2013.01)

(58) Field of Classification Search
USPC ............ 123/519, 516, 518, 520, 698; 96/133; 137/587–589
See application file for complete search history.

(56) References Cited

U.S. PATENT DOCUMENTS

| | | | | |
|---|---|---|---|---|
| 4,951,643 A * | 8/1990 | Sato et al. | ...................... | 123/520 |
| 5,207,808 A * | 5/1993 | Haruta et al. | ................... | 96/131 |
| 5,337,721 A * | 8/1994 | Kasuya et al. | ................ | 123/519 |
| 5,564,398 A * | 10/1996 | Maeda et al. | .................. | 123/520 |
| 5,599,384 A * | 2/1997 | Yoshida et al. | ................. | 96/143 |
| 6,540,815 B1 * | 4/2003 | Hiltzik et al. | ................... | 95/146 |
| 6,769,415 B2 * | 8/2004 | Reddy et al. | .................. | 123/519 |
| 6,959,698 B2 * | 11/2005 | Ikuma et al. | .................. | 123/519 |
| 7,047,952 B1 * | 5/2006 | Yamauchi et al. | ............ | 123/519 |
| 7,059,306 B2 * | 6/2006 | Reddy | ............................ | 123/518 |
| 7,175,698 B2 * | 2/2007 | Matsuura et al. | ............... | 96/134 |
| 7,294,179 B2 * | 11/2007 | Kim et al. | ....................... | 96/121 |
| 7,789,075 B2 * | 9/2010 | Makino | ......................... | 123/519 |
| 7,909,919 B2 * | 3/2011 | Kosugi et al. | ................... | 96/126 |
| 8,177,893 B2 * | 5/2012 | Kosugi | ............................ | 96/126 |
| 2002/0020398 A1 * | 2/2002 | Kimoto et al. | ................ | 123/519 |
| 2004/0083894 A1 * | 5/2004 | Koyama et al. | ................. | 96/133 |
| 2011/0308394 A1 * | 12/2011 | Kim et al. | ....................... | 96/146 |
| 2013/0037006 A1 * | 2/2013 | Kosugi et al. | ................. | 123/520 |
| 2013/0183207 A1 * | 7/2013 | Kimoto et al. | ................ | 422/255 |

FOREIGN PATENT DOCUMENTS

| | | |
|---|---|---|
| JO | 10037812 | 2/1998 |
| JP | 07-151021 | 6/1995 |
| JP | 2001343845 | 11/2001 |
| JP | 2002-235610 | 8/2002 |

(Continued)

*Primary Examiner* — Mahmoud Gimie
*Assistant Examiner* — David Hamaoui
(74) *Attorney, Agent, or Firm* — Ladas & Parry LLP

(57) ABSTRACT

The present invention includes a fuel vapor processing apparatus including a communication passage connecting between a first space and a second space each containing an adsorption material capable of adsorbing fuel vapor. The communication passage includes a dissipation delaying space capable of delaying dissipation or transmission of the fuel vapor between the first and second spaces. The communication passage further includes throttles positioned to oppose to each other across the dissipation delaying space.

7 Claims, 7 Drawing Sheets

(56) References Cited  * cited by examiner

FOREIGN PATENT DOCUMENTS

| | | |
|---|---|---|
| JP | 2005023835 | 1/2005 |
| JP | 2005-195007 | 7/2005 |
| JP | 2008-144699 | 6/2008 | ered

FUEL VAPOR PROCESSING APPARATUS

This application claims priority to Japanese patent application serial number 2008-270914, the contents of which are incorporated herein by reference.

BACKGROUND OF THE INVENTION

1. Field of the Invention

The present invention relates to a fuel vapor processing apparatus for processing fuel vapor that may be produced within a fuel tank.

2. Description of the Related Art

A known fuel vapor processing apparatus includes a tank-side adsorption material contained in a first space communicating with a space within a fuel tank, and an atmosphere-side adsorption material contained in a second space having one end communicating with the first space via a communication passage and having the other end open into the atmosphere. Therefore, the tank-side adsorption material within the first space can adsorb fuel vapor dissipated from the space within the fuel tank. The atmosphere-side adsorption material within the second space can adsorb a part of the fuel vapor that may be leaked from the first space.

This type of fuel vapor processing apparatus is disclosed, for example, in Japanese Laid-Open Patent Publication No. 10-37812. As shown in FIG. 9, a fuel vapor processing apparatus disclosed in this publication includes a first canister 101 and a second canister 102. The first canister 101 has a first space 101s defined therein and containing activated carbon C. The second canister 102 has a second space 102s defined therein and containing honeycomb activated carbon H. The first canister 101 includes a tank port 101t communicating with a space defined within a fuel tank (not shown), so that fuel vapor dissipated from the space within the fuel tank can be adsorbed within the first canister 101. The second canister 102 can adsorb a part of the fuel vapor leaked from the first canister 101 and is connected to the first canister 101 via a communication pipe 103. The second canister 102 is formed with an atmospheric port 102e at an end surface on the side opposite to the communication pipe 103.

Therefore, for example, during filling of fuel into the fuel tank, air within the fuel tank may be discharged to the atmosphere from the atmospheric port 102e via the first canister 101, the communication pipe 103 and the second canister 102.

According to the fuel vapor processing apparatus of the above publication, a part of the fuel vapor leaked from the first canister 101 may quickly reach the second canister 102, because the first canister 101 and the second canister 102 are connected to each other by the communication pipe 103 that has a relatively thin diameter. In other words, a fuel vapor dissipation preventing effect of the communication pipe 103 is small, and therefore, an amount of dissipation of the fuel vapor toward the side of the second canister 102 is large.

This can be improved by setting the length of the communication pipe 103 to be large. However, if the length of the communication pipe 103 is large, the resistance against flow of air within the communication pipe 103 increases to prevent smooth flow of air within the communication pipe 103 when air within the fuel tank is allowed to be released to the outside, for example, during filling of fuel into the fuel tank.

Therefore, there is a need in the art for a fuel vapor processing apparatus that can decrease the amount of dissipation of fuel vapor from a first space into a second space and can minimize resistance of flow of air when air flows between the first space and the second space.

SUMMARY OF THE INVENTION

One aspect according to the present invention includes a fuel vapor processing apparatus including a communication passage connecting between a first space and a second space each containing an adsorption material capable of adsorbing fuel vapor. The communication passage includes a dissipation delaying space capable of delaying dissipation or transmission of the fuel vapor between the first and second spaces. The communication passage further includes throttles positioned to oppose to each other across the dissipation delaying space.

DETAILED DESCRIPTION OF THE INVENTION

Figure 1:
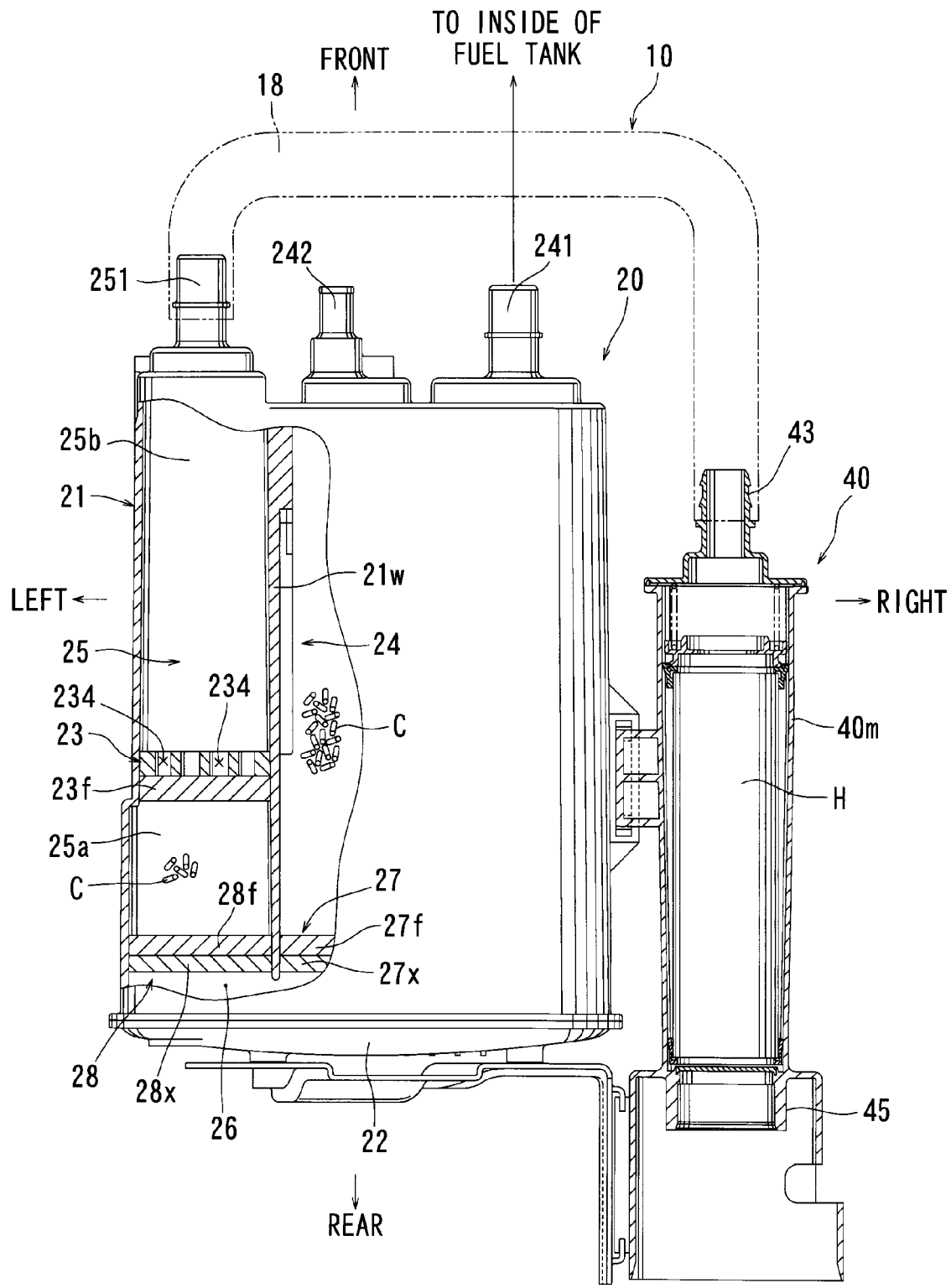
FIG. 1 is a view, with a part broken away, of a fuel vapor processing apparatus having a first canister and a second canister according to an embodiment of the present invention.

Each of the additional features and teachings disclosed above and below may be utilized separately or in conjunction with other features and teachings to provide improved fuel vapor processing apparatus. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a fuel vapor processing apparatus includes a first space and a second space. The first space communicates with a space within a fuel tank and contains a tank-side adsorption material therein, so that fuel vapor dissipating from the space within the fuel tank can be adsorbed by the tank-side adsorption material. The second space has a first end communicating with the first space via a communication passage and has a second end open into an atmosphere. The second space contains therein an atmosphere-side adsorption material, so that a part of the fuel vapor leaking from the first space can be adsorbed by the atmosphere-side adsorption material. The communication passage includes a dissipation delaying space and throttles. The dissipation delaying space is capable of delaying dissipation of the fuel vapor. The throttles are disposed on opposite sides of the dissipation delaying space and are opposed to each other across the dissipation delaying space.

Therefore, the fuel vapor dissipating from the first space into the second space via the communication passage can be accumulated within the communication passage, so that dissipation of the fuel vapor into the second space can be inhibited. In other words, an amount of the fuel vapor dissipating toward the side of the second space can be reduced.

In addition, because the throttles are positioned to oppose to each other across the dissipation delaying space, it is possible to reduce resistance against flow of air through the communication passage.

The fuel vapor processing apparatus may include a first canister defining the first space therein and a second canister defining the second space therein. The dissipation delaying space may be defined within at least one of the first and second canisters or between the first and second canisters.

In another embodiment, the fuel vapor processing apparatus includes a single canister having the first space, the second space and the dissipation delaying space defined therein.

The throttles may be positioned on the upper side of the dissipation delaying space. With this arrangement, the fuel vapor heavier than air can be effectively accumulated within the dissipation delaying space, so that it is possible to further decrease the amount of dissipation of the fuel vapor toward the side of the second space.

An embodiment of the present invention will now be described with reference to FIGS. 1 to 8. A fuel vapor processing apparatus according to the embodiment is adapted to be mounted to a vehicle, such as an automobile. In FIGS. 1 to 8, a front side, a rear side, a left side, a right side, an upper side and a lower side correspond to a front side, a rear side, a left side, a right side, an upper side and a lower side of the fuel vapor processing apparatus, respectively.

A fuel vapor processing apparatus 10 shown in FIG. 1 is aimed to prevent fuel vapor produced within a fuel tank from leaking to the atmosphere. As shown in FIG. 1, the apparatus 10 generally includes a first canister 20 and a second canister 40 connected in series with each other by a communication pipe 18.

<First Canister>

The first canister 20 has an adsorption material C contained therein. The adsorption material C can adsorb and capture fuel vapor that may be introduced into the first canister 20 from a space within the fuel tank. As shown in FIG. 1, the first canister 20 includes a case body 21 and a cover 22. The case body 21 has an internal space divided into a plurality of chambers. The cover 22 can close a rear opening (lower opening in FIG. 1) of the case body 21. More specifically, the internal space of the case body 21 is divided into a main chamber 24 and an auxiliary chamber 25 separated by a longitudinal partition wall 21w that extends in forward and rearward directions. The auxiliary chamber 25 is divided further into a first auxiliary chamber 25a and a second auxiliary chamber 25b by a transverse partition wall 23.

The adsorption material C is in forms of granules or particles and is filled within the main chamber 24. The main chamber 24 communicates with a tank port 241 and a purge port 242 formed in a front wall of the case body 21 via a perforated plate (not shown) serving to hold the adsorption material C. The tank port 241 is connected to the fuel tank via a fuel vapor passage (not shown). The purge port 242 is connected to an intake air passage of an internal combustion engine (not shown) via a purge passage (not shown).

An internal cover plate 27 covers an opening of the main chamber 24 of the case body 21 formed on the side of the cover 22. The internal cover plate 27 is configured to allow passage of gas and includes a first filter 27f and a perforated plate 27x for holding the adsorption material C within the main chamber 24.

The adsorption material C is also filled within the first auxiliary chamber 25a of the auxiliary chamber 25 and is held by a second filter 23f positioned on the side of the transverse partition plate 23. A rear opening of the first auxiliary chamber 25a is covered by an internal cover plate 28 that includes a third filter 28f and a perforated plate 28x. A space 26 is defined by the internal cover plate 28 covering the first auxiliary chamber 25a, the internal cover plate 27 covering the main chamber 24, and the cover 22 of the case body 21. The space 26 serves as a communication space for communicating between the main chamber 24 and the first auxiliary chamber 25a.

The second auxiliary chamber 25b of the auxiliary chamber 25 serves as a dissipation delaying chamber for delaying dissipation of the fuel vapor that may be leaked from the first auxiliary chamber 25a. The second auxiliary chamber 25b communicates with a connection port 251 formed on a front wall of the case body 21. More specifically, the connection port 251 is in communication with the upper portion of the second auxiliary chamber 25b and is throttled or narrowed in comparison with the upper portion of the second auxiliary chamber 15b. The communication pipe 18 communicating with the second canister 40 is connected to the connection port 251.

Figure 2:
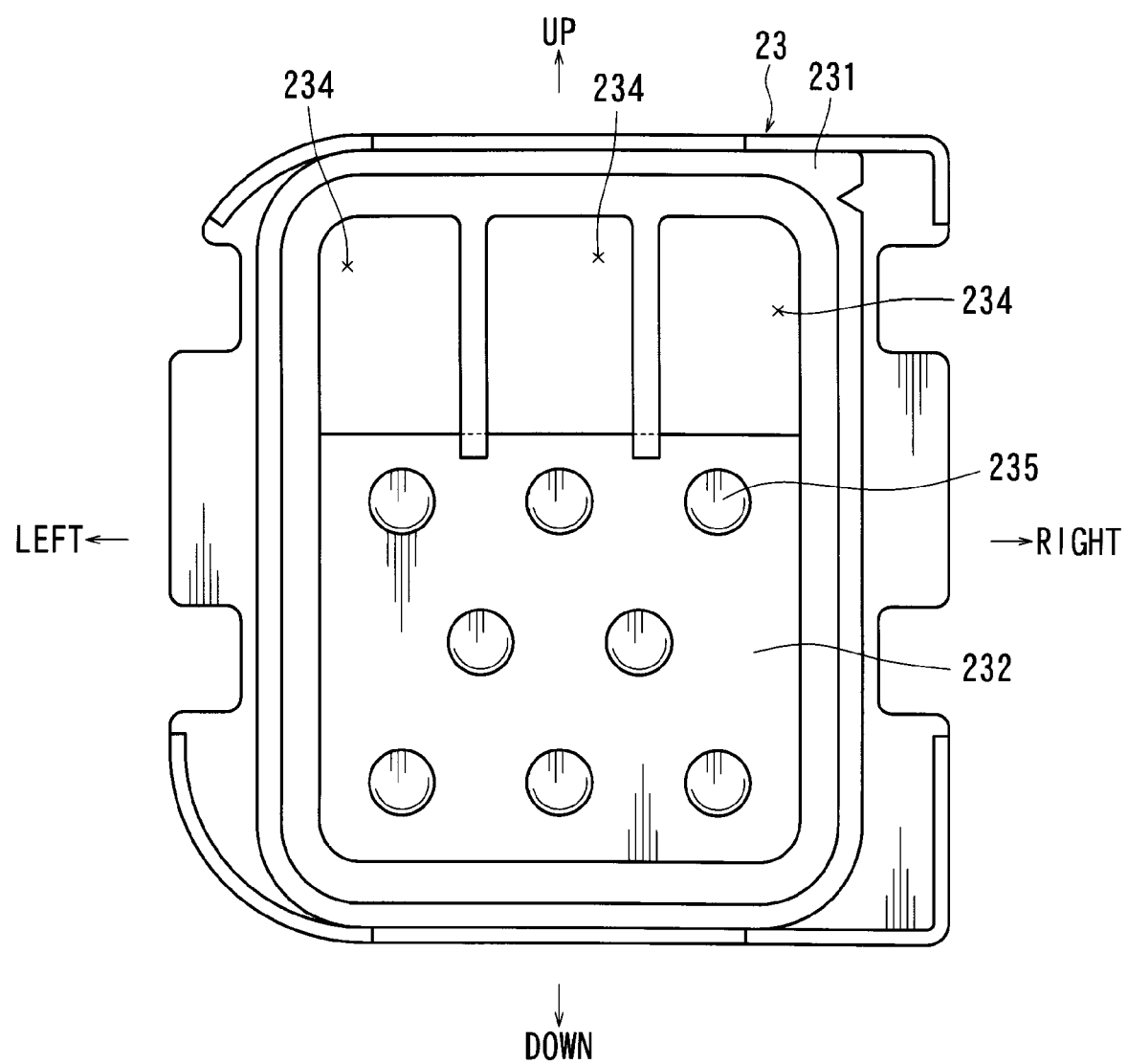
FIG. 2 is a front view of a transverse partition plate of the first canister.

The transverse partition plate 23 dividing the auxiliary chamber 25 has through holes 234 serving as a throttle provided between the first auxiliary chamber 25a and the second auxiliary chamber 25b. As shown in FIG. 2, the transverse partition plate 23 has a substantially rectangular plate body 232 having the though holes 234. The through holes 234, in this example, are three in number and are arranged in right and left directions at the upper portion of the plate body 232. A peripheral fixing portion 231 is formed at the peripheral portion of the plate body 232 for fixing the plate body 232 to the inner wall surface of the case body 21. A plurality of projections 235 for holding the second filter 23f are formed on the surface of the plate body 232 on the side of the first auxiliary chamber 25a.

The three through holes 234 formed at the upper portion of the plate body 232 are each configured to have a rectangular window-like shape and are opposed to the connection port 251 across the dissipation delaying space defined within the first auxiliary chamber 25a. Because the three through holes 234 are formed at the upper portion of the plate body 232 and the connecting port 251 is in communication with the upper portion of the second auxiliary chamber 25b, fuel vapor (heavier than air) leaked from the first auxiliary chamber 25a via the through holes 234 may accumulate within the lower portion of the second auxiliary chamber 25b that serves as the dissipation delaying space.

The second canister 40 has a honeycomb adsorption material H contained therein. The adsorption material H can adsorb and capture fuel vapor that may be leaked from the first canister 20 and introduced into the second canister 40 via the communication pipe 18. The second canister 40 includes a tubular case body 40m containing the adsorption material H therein. A connection port 43 is formed at the front end of the case body 40m for connecting to the communication pipe 18. In addition, an atmospheric port 45 opening into the atmosphere is formed at the rear end of the case body 40m.

Each of the granular adsorption material C and the honeycomb adsorption material H may be made of activated carbon or the like, which can adsorb dissipating fuel vapor and can desorb the adsorbed fuel by purging with air.

When fuel vapor is produced within the fuel tank during stopping of the engine, the fuel vapor is introduced into the main chamber 24 of the first canister 20 via the fuel vapor passage and the tank port 241 and is then adsorbed by the adsorption material C contained in the main chamber 24. If a part of the fuel vapor passes through the main chamber 24 to reach the first auxiliary chamber 25a via the communication space 26, this part of the fuel vapor can be adsorbed by the adsorption material C contained in the first auxiliary chamber 25a. If this part of the fuel vapor cannot be completely adsorbed by the adsorption material C contained in the first auxiliary chamber 25a, the remaining fuel vapor can be introduced into the second auxiliary chamber 25b (i.e., the dissipation delaying chamber) via the through holes 234 of the transverse partition plate 23 and can be accumulated within the lower portion of the second auxiliary chamber 25b. If a part of the fuel vapor accumulated within the second auxiliary chamber 25b leaks from the second auxiliary chamber 25b, such a part of the fuel vapor may be introduced into the second canister 40 via the communication pipe 18 and can then be adsorbed by the honeycomb adsorption material H.

On the other hand, if air is discharged from the fuel tank, for example, during filling of fuel into the fuel tank, such air is subsequently discharged to the outside via the fuel vapor passage, the first canister 30, the communication pipe 18 and the second canister 40.

During the operation of the engine, a negative pressure may be produced within the intake air passage of the engine. Therefore, outside air may flow into the second canister 40 via the atmospheric port 45 and subsequently into the first canister 20 via the communication pipe 18. After entering the first canister 20, the air may flow through the second auxiliary chamber 25b, the first auxiliary chamber 25a, the communication space 26 and the main chamber 24 and may eventually flow into the intake air passage of the engine via the purge port 242 and the purge passage. In this occasion, no substantial resistance may be produced against flow of the air, because the connection port 251 and the through holes 234 of the transverse partition plate 23 are opposed to each other across the second auxiliary chamber 25b serving as the dissipation delaying space.

Because the air flows from the second canister 40 into the first canister 20 in this way, the fuel adsorbed by the honeycomb adsorption material H and the granular adsorption materials C can be purged with the air and desorbed from the adsorption materials H and C. The fuel desorbed from the adsorption materials H and C can be therefore carried by the air and can be supplied into the intake air passage of the engine.

With the above arrangement, the fuel vapor processing apparatus 10 of this embodiment can effectively prevent fuel vapor produced into the fuel tank from flowing into the atmosphere.

In the above embodiment, the main chamber 24, the communication space 26 and the first auxiliary chamber 25a of the first canister 20 serve as a first space. The second auxiliary chamber 25b and the communication pipe 18 serve as a communication passage. The second auxiliary chamber 25b serves as the dissipation delaying space. The internal space of the second canister 40 serves as a second space. The through holes 234 of the transverse partition plate 23 of the first canister 20 and the connection port 251 serve as throttles. The adsorption materials C serve as a tank-side adsorption material. The adsorption material H serves as an atmosphere-side adsorption material.

According to the fuel vapor processing apparatus 10 of this embodiment, the communication passage communicating between the main chamber 24, the communication space 26 and the first auxiliary chamber 25a (serving as the first space) of the first canister 20 and the internal space (serving as the second space) of the second canister 40 includes the dissipation delaying space (second auxiliary chamber 25b) for delaying dissipation of the fuel vapor and the throttles (the through holes 234 of the transverse partition plate 23 and the connecting port 251) provided on opposite sides of the dissipation delaying space. Therefore, it is possible to inhibit or minimize potential dissipation of the fuel vapor from the first auxiliary chamber 25a (i.e., the first space) into the second canister 40 via the second auxiliary chamber 25b (i.e., the dissipation delaying space) and the communication pipe 18, because the fuel vapor may be accumulated within the second auxiliary chamber 25b (i.e., the dissipation delaying space). In other words, it is possible to reduce the amount of dissipation of fuel vapor toward the side of the second canister 40.

In addition, because the second auxiliary chamber 25b (i.e., the dissipation delaying space) is provided between the through holes 234 of the transverse partition plate 23 and the connection port 251 (i.e., the throttles) which are opposed to each other, it is possible to prevent increase of resistance against flow of air through the second auxiliary chamber 25b (i.e., the dissipation delaying space) during filling of fuel into the fuel tank or during the operation of the engine.

Further, because the through holes 234 of the transverse partition plate 23 and the connection port 251 provided on opposite sides with respect to the second auxiliary chamber 25b (i.e., the dissipation delaying space) are positioned on the upper side of the second auxiliary chamber 25b, the fuel vapor heavier than air can be effectively accumulated within the second auxiliary chamber 25b (i.e., the dissipation delaying space). Therefore, it is possible to reduce the amount of dissipation of the fuel vapor toward the side of the second canister 40.

The present invention may not be limited to the above embodiment may be modified in various ways within the scope of the invention. FIGS. 3 to 8 show various alternative embodiments. In these figures like members are given the same reference numbers as the first embodiment and description of these members will not be repeated.

Figure 3:
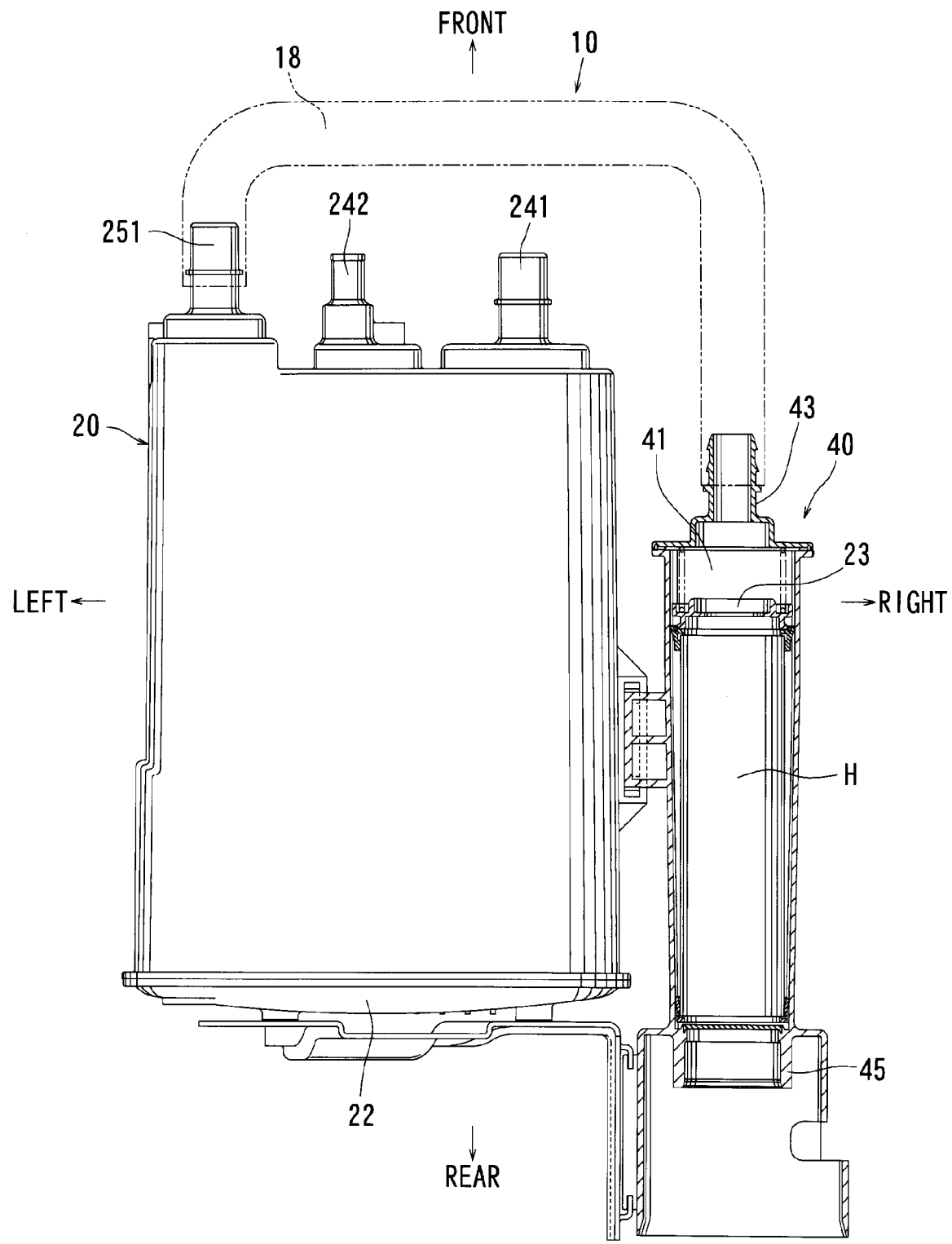
FIG. 3 is a view, with a part broken away, of a fuel vapor processing apparatus having a first canister and a second canister according to an alternative embodiment of the present invention.

In the above embodiment, the second auxiliary chamber 25b (dissipation delaying space) is provided within the first canister 20, and the through holes 234 of the transverse partition plate 23 and the connection port 251 are used as the throttles. However, as shown in FIG. 3, it is possible to provide the transverse partition plate 23 within the second canister 40, so that a space 41 between the transverse partition plate 23 and the connection port 43 can be used as a dissipation delaying space. In this case, the configuration of the transverse partition plate 23 may be suitably changed to correspond to the cross sectional shape of the second canister 40.

Figure 4:
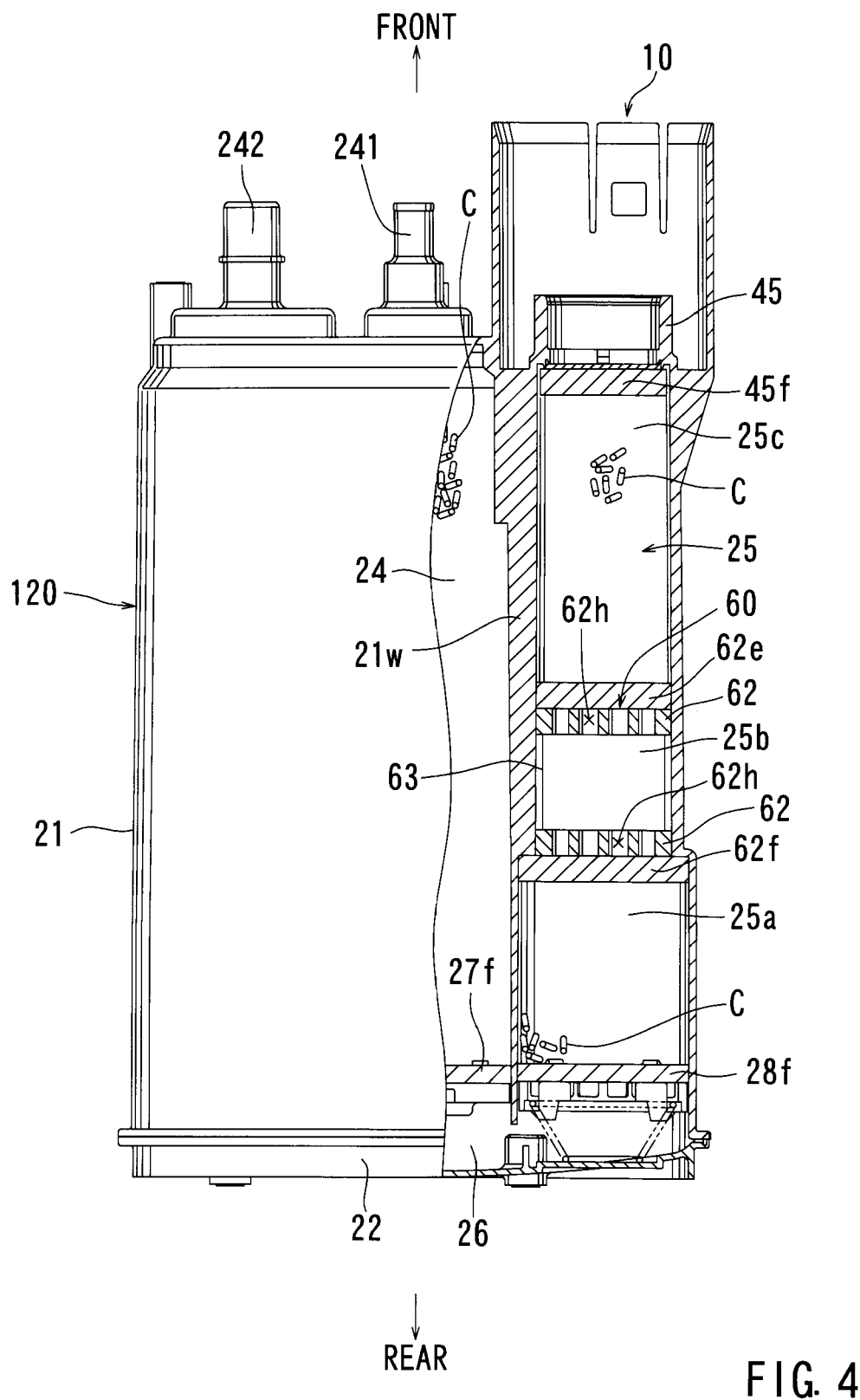
FIG. 4 is a view, with a part broken away, of a fuel vapor processing apparatus having a canister according to another alternative embodiment of the present invention.

In addition, although the fuel vapor processing apparatus 10 of the above embodiment has the first canister 20 and the second canister 40 that are formed separately from each other, the first and second canisters 20 and 40 can be integrated into a single canister 120 as shown in FIG. 4. The internal space of the case body 21 of the canister 120 is divided into the main chamber 24 and the auxiliary chamber 25 by the longitudinal partition wall 21w. The auxiliary chamber 25 is further divided into the first auxiliary chamber 25a, the second auxiliary chamber 25b and a third auxiliary chamber 25c by a transverse partition member 60. Each of the first auxiliary chamber 25a and the third auxiliary chamber 25c has the adsorption material C contained therein. The second auxiliary chamber 25b is positioned between the first auxiliary chamber 25a and the third auxiliary chamber 25c, which are positioned on the rear side and the front side of the second auxiliary chamber 25b, respectively. In this embodiment, the second auxiliary chamber 25b serves as a dissipation delaying space. The atmospheric port 45 is formed at the front wall of the case body 21 and communicates with the third auxiliary chamber 15c via a filter 45f.

Figure 5:
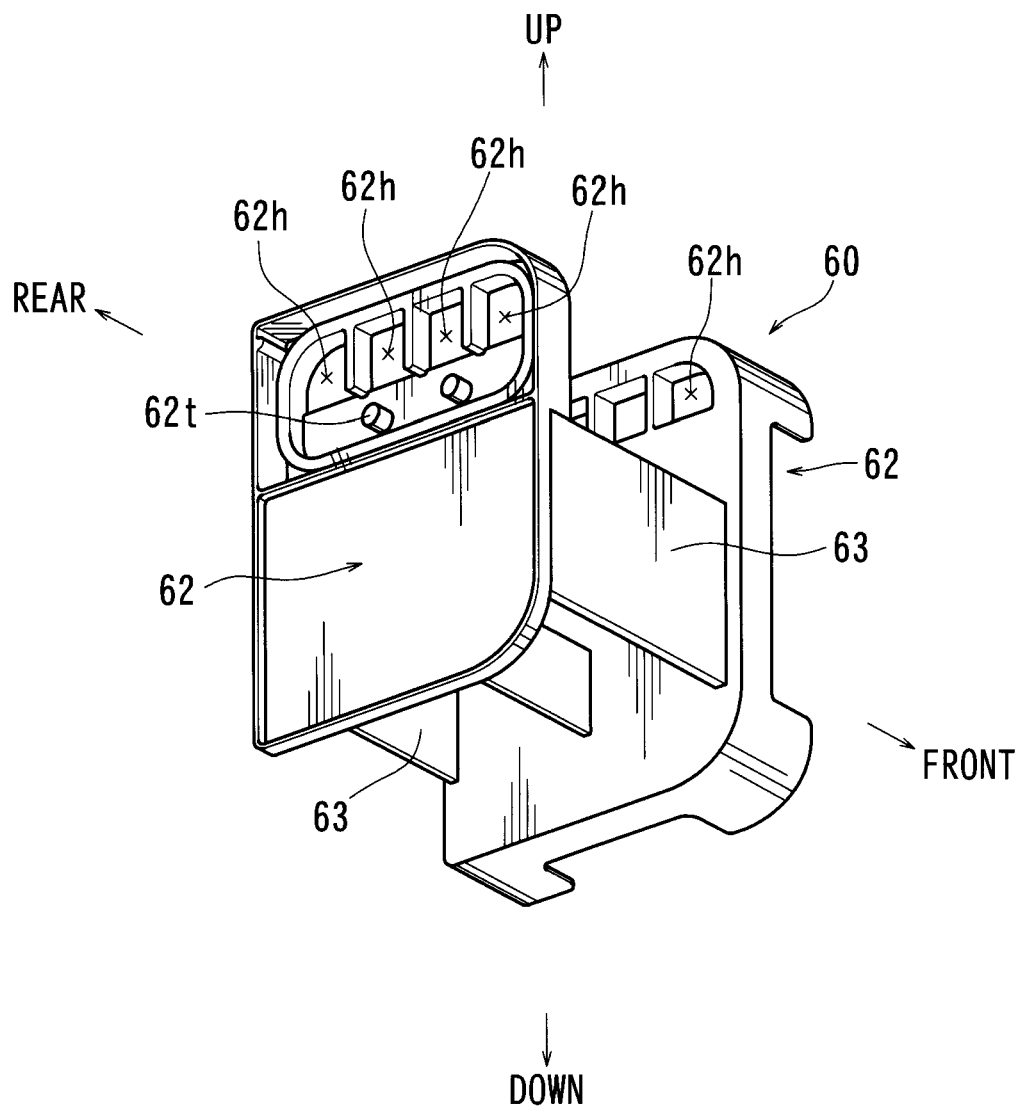
FIG. 5 is a perspective view of a transverse partition member of the canister shown in FIG. 4.
Figure 6:
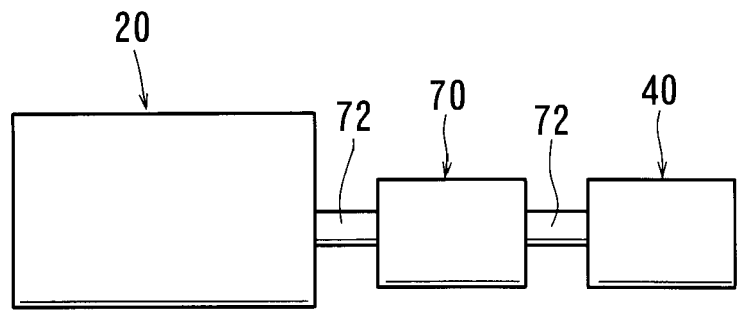
FIG. 6 is a schematic diagram of a fuel vapor processing apparatus according to a further alternative embodiment of the present invention.
Figure 7:
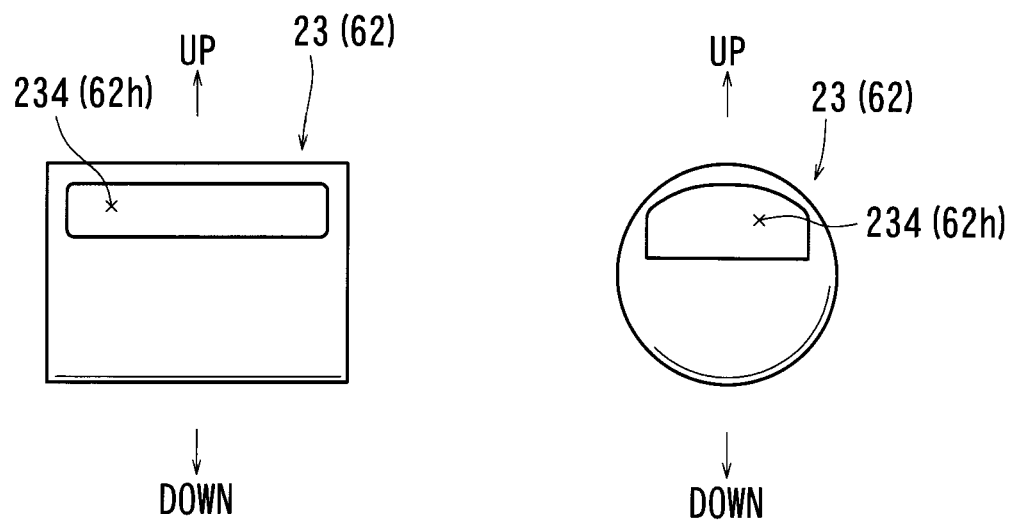
FIG. 7(A) and FIG. 7(B) are front views of alternative partition plates.

As shown in FIG. 5, the transverse partition member 60 includes a pair of front and rear transverse partition plates 62 and a connection plate 63 connecting the transverse partition plates 62 to each other, so that the transverse partition plates 62 are held in parallel to each other. In this example, four window-like through holes 62h are formed in the upper portion of each of the transverse partition plates 62 and are arranged in the right and left directions, so that the through holes 62h of the front transverse partition plate 62 and the through holes 62h of the rear transverse partition plate 62 are opposed to each other across the dissipation delaying space. The peripheral portions of the transverse partition plates 62 can be fixed to the inner wall of the case body 21, for example, by bonding or other suitable means. Projections 62t are formed on the surface of the transverse partition plate 62 on the side of the first auxiliary chamber 25a and also on the surface of the transverse partition plate 62 on the side of the third auxiliary chamber 25c for holding filters 62f and 62e against these surfaces, respectively.

Thus, according to the canister 120 of this alternative embodiment, the main chamber 24, the communication space 26 and the first auxiliary chamber 25a serve as a first space, the second auxiliary chamber 25b serves as the dissipation delaying space, and the third auxiliary chamber 25c serves as a second space. The through holes 62h on opposite sides of the transverse partition member 60 serve as throttles. The adsorption materials C contained in the main chamber 24 and the first auxiliary chamber 25a serve as a tank-side adsorption material. The adsorption material C contained in the third auxiliary chamber 25c serves as an atmosphere-side adsorption material.

Further, although the dissipation delaying space is formed within the first canister 20, the second canister 20 or the canister 120 in the above embodiments, it is possible to provide a container 70 defining a dissipation delaying space therein and connected to the first canister 20 and the second canister 50 via respective connecting passages 72. In this case, ports of the container 70 for connecting to the connecting passages 72 may serve as throttles.

Furthermore, although the through holes 234 and the through holes 62h are formed to be arranged in the right and left directions in the upper portions of the transverse partition plate 23 and the transverse partition plates 62, respectively, in the above embodiments, the through holes 234 (62h) can also be formed in series into a single elongated hole as shown in FIG. 7(A) or 7(B). In addition, the configuration of the transverse partition plate 23 and the configurations of the transverse partition plates 62 can be suitably changed as shown in FIGS. 7(A) and 7(B).

Figure 8:
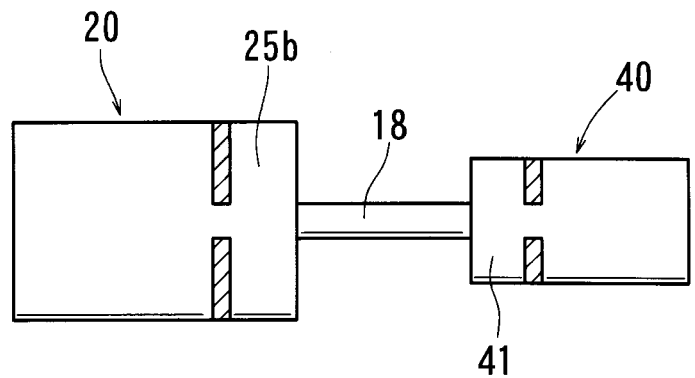
FIG. 8 is a schematic diagram of a fuel vapor processing apparatus according to a further alternative embodiment of the present invention.
Figure 9:
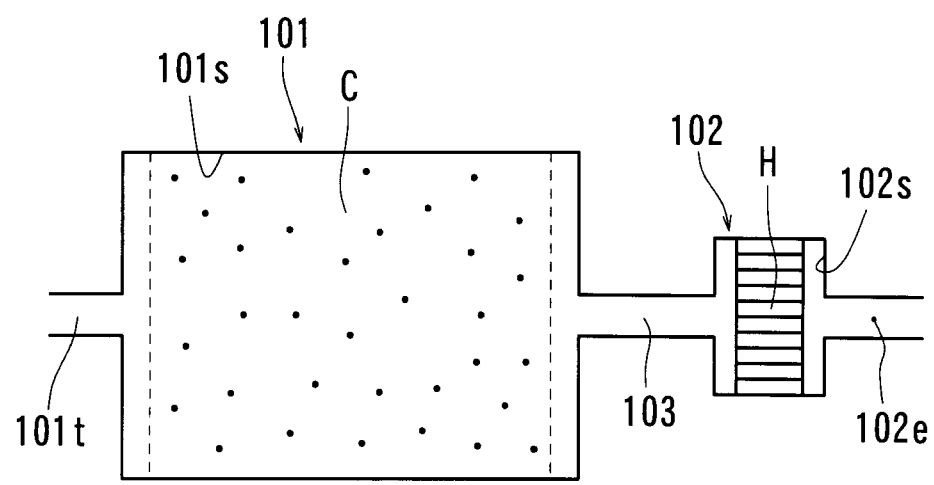
FIG. 9 is a schematic view of a known fuel vapor processing apparatus.

Furthermore, although the dissipation delaying space is formed within the first canister 20, the second canister 20 or the single canister 120 in the above embodiments, it is possible to provide the dissipation delaying spaces 25b and 41 within the first canister 20 and the second canister 40, respectively, as shown in FIG. 8.

Furthermore, although the honeycomb adsorption material H is used as an adsorption material of the second canister 40, the granular adsorption material C can be used in place of the honeycomb adsorption material H.

This invention claims:

1. A fuel vapor processing apparatus comprising:
a first canister including a first case body that defines therein a first adsorption chamber, a second adsorption chamber and a dissipation delaying space; and
a second canister including a second case body that defines therein an atmospheric-side adsorption chamber;
wherein:
each of the first adsorption chamber and the second adsorption chamber of the first canister contains a tank-side adsorption material;
the atmospheric-side adsorption chamber of the second canister communicates with the dissipation delaying space and contains an atmospheric-side adsorption material;
the first adsorption chamber of the first canister communicates with a space within a fuel tank and is configured such that that fuel vapor dissipating from the space within the fuel tank is adsorbed by the tank-side adsorption material of the first adsorption chamber as the fuel vapor flows in a first direction within the first adsorption chamber;
the second adsorption chamber is disposed on a downstream side of the first adsorption chamber and is configured such that the fuel vapor is adsorbed by the tank-side adsorption material of the second adsorption chamber as the fuel vapor flows in a second direction within the second adsorption chamber;
the second direction is opposite to the first direction;
the dissipation delaying space is disposed on a downstream side of the second adsorption chamber and containing no adsorption material, so that the dissipation delaying space is capable of delaying dissipation of fuel vapor flowing from the second adsorption chamber;
the fuel vapor dissipated within the dissipation delaying space flows in the second direction and further flows into the atmospheric-side adsorption chamber of the second canister so as to be adsorbed by the atmospheric-side adsorption material;
the first canister further includes a first throttle and a second throttle respectively disposed at a first end and a second end of the dissipation delaying space, the first end and the second end being opposite to each other with respect to the second direction;
the first throttle is a plurality of through holes formed in a partition plate disposed at the first end of the dissipation delaying space;
the second throttle is a connection port provided at the first case body, so that the fuel vapor flows from the dissipation delaying space of the first canister to the atmospheric-side adsorption chamber of the second canister via the connection port;
the dissipation delaying space has a first length along the second direction;

the second adsorption chamber has a second length along the second direction; and the first length is longer than the second length and is longer than half a length of the first adsorption chamber along the first direction.

2. The fuel vapor processing apparatus as in claim 1, wherein the plurality of through holes have a rectangular shape.

3. The fuel vapor processing apparatus as in claim 2, wherein at least one side of the rectangular shape has an arc shape.

4. The fuel vapor processing apparatus as in claim 1, wherein the partition plate includes a plurality of projections that hold a filter.

5. The fuel vapor processing apparatus as in claim 1, wherein the first canister further includes a partition wall disposed within the first case body and extending substantially in parallel to the first and second directions, wherein an inner space of the first case body is separated into a first side space and a second side space by the partition wall, the first adsorption chamber is positioned in the first side space, and the second adsorption chamber and the dissipation delaying space are positioned in the second side space.

6. The fuel vapor processing apparatus as in claim 1, wherein the dissipation delaying space has a first cross sectional area within a first plane along the second direction, the second adsorption chamber has a second cross sectional area within the first plane along the second direction, the first cross sectional area is larger than the second cross sectional area.

7. The fuel vapor processing apparatus as in claim 6, wherein the first adsorption chamber has a third cross sectional area within a second plane along the first direction, the second plane is the same plane as the first plane, and the third cross sectional area is larger than the first cross sectional area of the dissipation delaying space.

* * * * *